March 17, 1959     H. S. CAMPBELL     2,877,856

AIRCRAFT ROTOR BLADE CONTROL MECHANISM

Original Filed Nov. 22, 1946     3 Sheets-Sheet 1

INVENTOR
Harris S Campbell
BY
ATTORNEYS

March 17, 1959  H. S. CAMPBELL  2,877,856
AIRCRAFT ROTOR BLADE CONTROL MECHANISM
Original Filed Nov. 22, 1946  3 Sheets-Sheet 3

INVENTOR
Harris S Campbell
BY
Synnestvedt & Lechner
ATTORNEYS

United States Patent Office 2,877,856
Patented Mar. 17, 1959

2,877,856

AIRCRAFT ROTOR BLADE CONTROL MECHANISM

Harris S. Campbell, Bryn Athyn, Pa., assignor to Autogiro Company of America, Philadelphia, Pa., a corporation of Delaware Original application November 22, 1946, Serial No. 711,604, now Patent No. 2,670,804, dated March 2, 1954. Divided and this application June 5, 1953, Serial No. 359,887

5 Claims. (Cl. 170—160.25)

This application is a division of my co-pending application, Serial No. 711,604, filed November 22, 1946, issued March 2, 1954 as Patent No. 2,670,804.

This invention relates to aircraft having rotative sustaining blades and to control mechanism for such aircraft. The invention is especially concerned with aircraft rotors in which both collective pitch and tilt of rotor thrust line are controlled.

One of the objects of the invention is the provision of means for controlling the pitch of a rotor operative by two different controllable mechanisms.

A further object of the invention is the provision of means for controlling the pitch of a rotor operative by two different controllable mechanisms, and incorporating a special arrangement of connections providing for combining the motions of the independently controllable mechanisms.

Another object of the invention is to provide in combination with means for causing lateral tilt of the lift line of a rotor, means for automatically increasing the mean pitch of the rotor whenever the lift line is tilted so as to compensate for the resultant loss of lift thrust.

Still further, the invention contemplates means for causing lateral tilt of the lift line of a rotor through cyclic pitch variation, together with means for automatically increasing the mean pitch of the rotor whenever the lift line is tilted from the vertical position in the lateral sense.

Still further, the invention contemplates mechanism for mean pitch compensation arranged to provide for greater mean pitch increase for a given angular tilt of the lift line in a range angularly offset from the vertical than in a range close to the vertical.

How the foregoing objects and advantages are attained, together with others which will occur to those skilled in the art, will appear more fully in the following description referring to the accompanying drawings in which—

Figure 1:
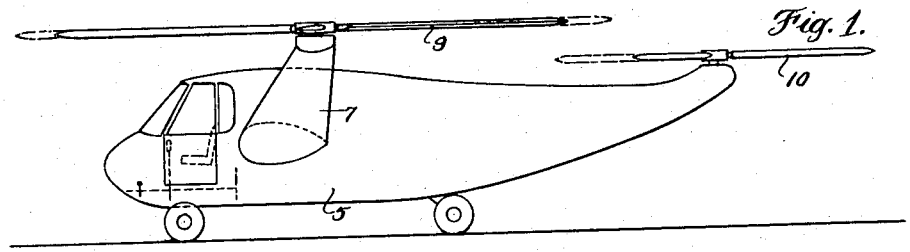
Figure 1 is a side outline view of a three-rotor aircraft constructed in accordance with the present invention.
Figure 2:
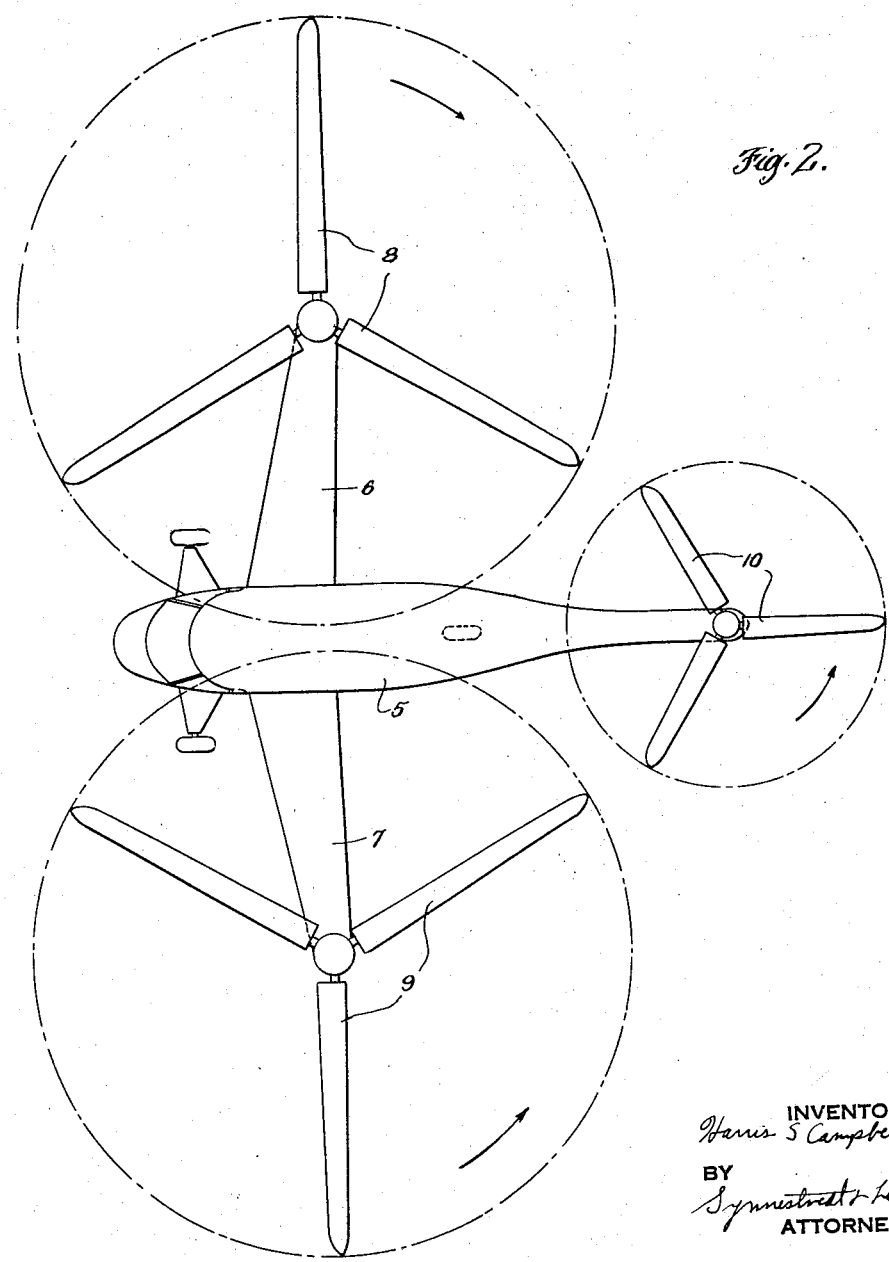
Figure 2 is a top plan view of the aircraft shown in Figure 1.

As seen in Figures 1 and 2, the aircraft comprises a body or fuselage 5 having a pair of laterally projecting outriggers or booms 6—7, each adapted to support a main sustaining rotor, the blades of one of which are indicated at 8 and the blades of the other of which are indicated at 9, the blades of these two rotors being oriented for rotation in opposite directions. Toward the rear of the fuselage a single small diameter rotor incorporating blades 10 is provided, all three rotors being arranged to rotate substantially about vertical axes. The rear rotor 10 is adapted to rotate in a plane somewhat below that of the main rotors 8 and 9.

In the preferred arrangement of the invention the axes of the two main rotors are desirably located slightly in advance of the center of gravity of the aircraft as a whole, the axis of the small diameter rear rotor being located well to the rear of said center of gravity, these relationships being of importance in order to secure proper control functions from the several rotors, as is described more fully herebelow.

Figure 3:
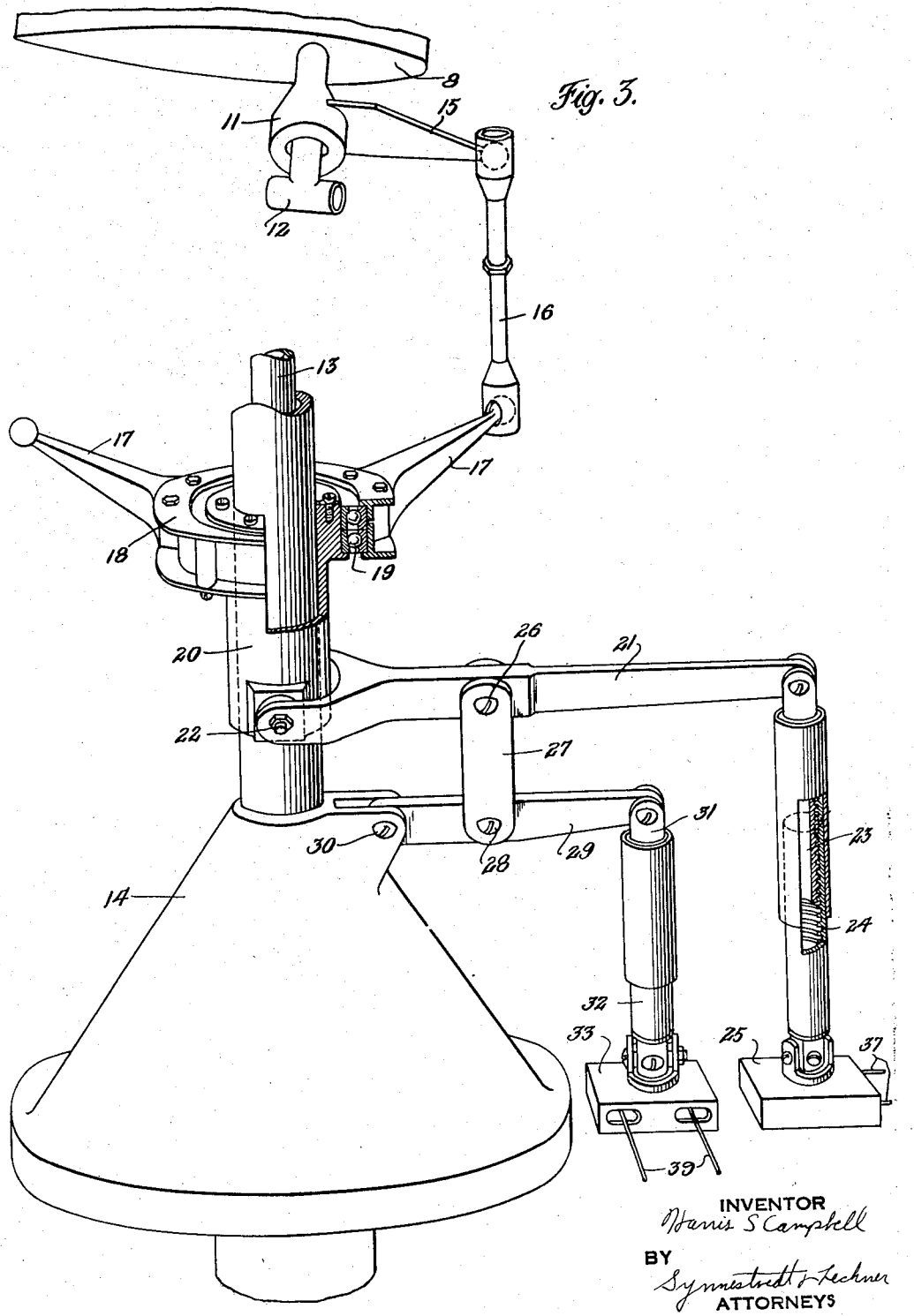
Figure 3 is an enlarged somewhat diagrammatic view of certain of the controls for the rotor blades of one of the rotors shown in Figures 1 and 2, with certain parts broken out and shown in section.
Figure 4:
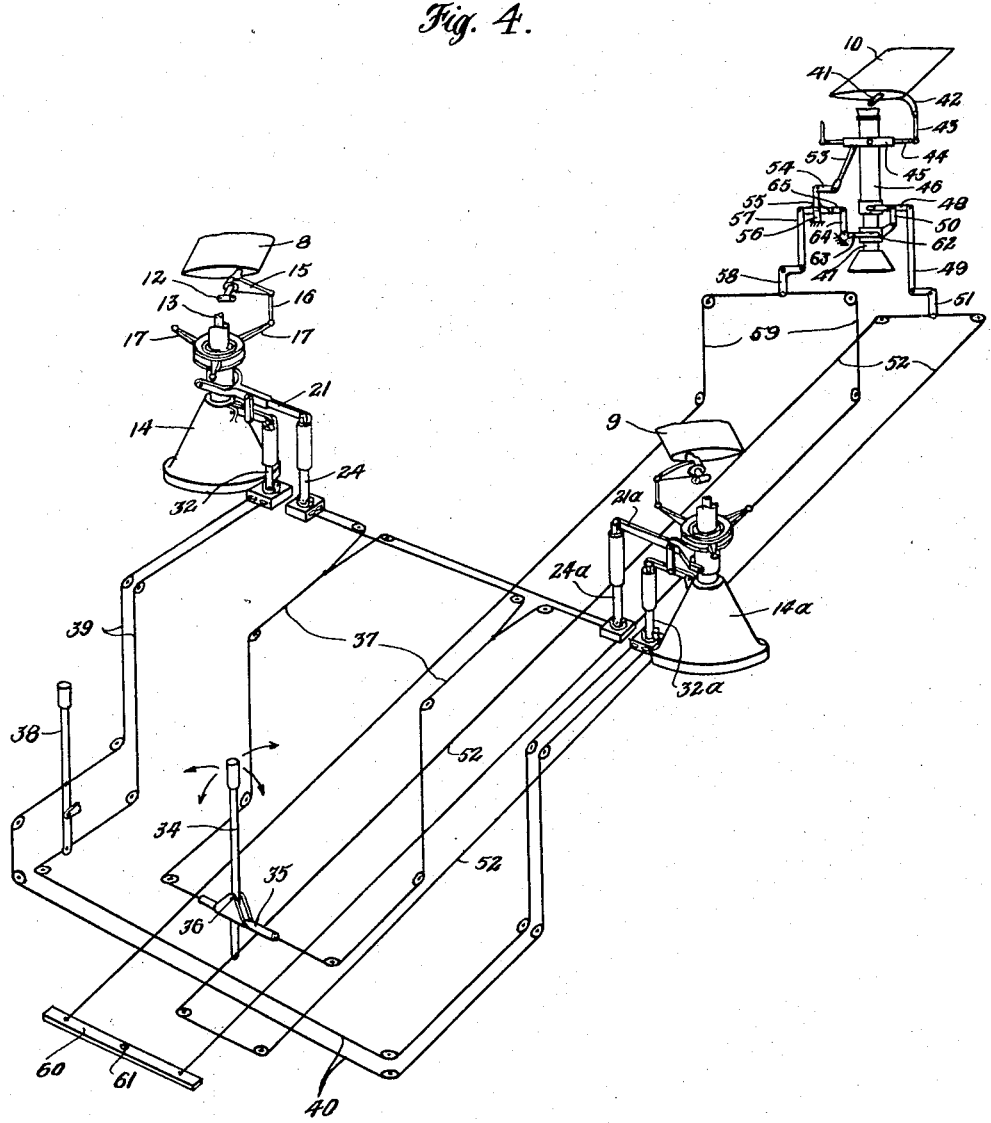
Figure 4 is a schematic view illustrating the control system of the present invention as applied to a three-rotor aircraft of the type shown in Figures 1 and 2.

It may here be noted that the various features of the controls to be described herebelow with reference to Figures 3 and 4 are applicable to rotor equipped aircraft of a variety of types, for instance aircraft in which the rotors are normally power driven, as in a helicopter, or rotors which are adapted for normal auto-rotative actuation. Moreover, various features of the invention are also applicable to aircraft in which the rotors are capable of both types of operation mentioned above. It is also mentioned that a number of the individual features of the control system to be described are applicable to any sustaining rotor whether the aircraft incorporates only one such rotor or a plurality thereof. However, since most features of the invention are of especial applicability to a multiple rotor aircraft in which the rotors are normally power driven, the disclosure herebelow is made with reference to that type of aircraft.

As best seen in Figure 3, each blade 8 of the right hand main rotor is adapted to be mounted at its root end by means of a journal 11 providing freedom for movement of the blade 8 in the pitch change sense, i. e., substantially about the longitudinal blade axis. Each blade is further preferably mounted by means of a flapping pivot indicated at 12, so as to provide freedom for the blade to move upwardly and downwardly and thus compensate for differential lift effects in translational flight in the manner well understood in this art. Additional blade mounting pivots such as a drag pivot may also be employed providing freedom for lag-lead blade movement generally within its mean path of rotation. It will be understood that the blade 8 shown in Figure 3 (and also the other blades of the rotor) is connected with a rotative hub through the pivot parts above mentioned, such hub being adapted to be driven by a vertical shaft indicated at 13.

It is to be understood that the blades 9 of the left hand main rotor are mounted in a manner similar to that described above in connection with Figure 3. The rotor driving and supporting shaft 13 may be journalled in any suitable manner, for instance by means of bearings housed within the fixed supporting cone or casing 14. The casing 14 may also incorporate drive gearing and other rotor drive transmission parts. Although the rotor drive transmission need not be considered in detail herein, it may be mentioned that the transmission preferably incorporates manually disconnectible means and also automatically disconnectible means providing for free overrunning of the rotors in the event of engine failure. It is contemplated that the mean rotor blade pitch of all rotors should be capable of adjustment to a value within the range at which autorotation will occur. The two main rotors are desirably geared to rotate together in positively predetermined relation, and preferably the power take-off for driving the rear rotor 10 is so arranged as to provide for continued rotation thereof with the main rotors, as by locating any clutches employed in the power transmission ahead of the point where power is taken off for the rear rotor. In this way autorotational actuation of the main rotors will serve to ensure continued rotation of the small diameter rear rotor, this being of importance in the arrangement shown, since, as described below, two of the primary control functions are assigned to the small rear rotor.

The mean blade pitch of each of the main rotors is controllable by mechanism illustrated in Figure 3. Here it will be seen that an arm 15 projects forwardly from the blade mounting journal 11, this arm serving to move the blade in the pitch change sense. Arm 15 is coupled by means of a ball jointed link 16 with an arm 17 projecting from a ring 18 which is rotatable with the rotor on a bearing 19. Bearing 19 is carried by a vertically movable sleeve 20. Upon upward movement of sleeve 20 it will be seen that the pitch angle of all of the blades 8 is increased, downward movement serving to effect simultaneous pitch decrease of all blades of the rotor.

Sleeve 20 is adapted to be moved vertically by means of a lever 21 which is pivoted to the sleeve at 22. Lever 21 may be actuated by means of a screw thread device incorporating internal and external threaded parts 23 and 24, the former being connected with lever 21 and the latter adapted to be rotated by means of a pulley or sprocket supported and enclosed within a casing 25.

Lever 21 is fulcrummed on a pivot 26 at the upper end of a link 27 which link is pivotally connected at 28 with a second lever 29, the latter being fulcrummed at 30 on a fixed part, such as the supporting cone 14. The free end of lever 29 is connected with an internal screw thread part 31 (similar to part 23 referred to above) which is in threaded engagement with an external threaded part 32 (similar to part 24), the part 32 being rotatable by a pulley or sprocket within the casing 33.

The lever system described just above is provided for the purpose of combining (in additive or subtractive senses) the motions originating from two different controllable mechanism described herebelow with reference to Figure 4.

Turning now to Figure 4, it will first be noted that the root end of one blade of each of the three rotors is indicated adjacent to the respective mountings for the rotors. Description of various of the individual control parts for the left hand main rotor (blades 9) need not be given, since such parts are counterparts of those described above with reference to the right hand main rotor. In Figure 4 corresponding control parts for the two main rotors bear the same reference numeral, but in the case of the left hand main rotor the letter *a* has been added to the reference numeral for convenience in separate identification.

The control system includes a control stick 34 movable in a longitudinal plane about a transverse pivot 35 and in a transverse plane about a fore and aft pivot 36. A closed circuit cable system 37 is associated with the stick 34 to be actuated upon transverse movement of the control strick, the cable system 37 being associated with the rotatable screw devices 24 and 24a for the two main rotors, these screws being arranged to provide for differential variation of the mean pitch of the two main rotors. Specifically, the arrangement is such that movement of the control stick in the transverse plane toward the right causes decrease of the mean pitch of the right hand main rotor and increase of the mean pitch of the left hand main rotor. Conversely, movement of the control stick to the left causes decrease of the mean pitch of the left hand rotor and increase of the pitch of the right hand rotor. In this way instinctive lateral control, control in roll, is provided by the conventional transverse movement of the control stick.

The mean pitch value of the two main rotors may also be increased and decreased concurrently in the same sense. For this purpose a mean pitch control lever 38 is provided, a closed circuit cable system 39 being extended from lever 38 to the control device 32 for the right hand rotor and a closed circuit cable system 40 being extended from lever 38 to the control device 32a for the left hand rotor. The control cable hook-up here employed and the orientation of the screw devices 32 and 32a is preferably such that movement of the control lever 38 rearwardly causes the mean pitch of both of the main rotors to increase and movement of the control stick 38 forwardly causes the mean pitch of both of the main rotors to decrease. Thus the control stick 38 constitutes the primary control organ for regulating ascent and descent of the aircraft.

The control functions described above thus include control of vertical flight and control of banking or rolling. The functions of directional control and control about the pitching axis of the aircraft are assigned to the rear rotor. For this purpose the mounting spar or root end fitting 41 of each blade 10 of the rear rotor is journalled on the hub of that rotor in a manner providing freedom for pitch change movement, preferably about the longitudinal blade axis. It is also contemplated that the blades of this rotor shall also have freedom for movement in the flapping sense about flapping pivots such as those described above with reference to Figure 3. They may further be provided with drag pivots if desired, but since such mounting mechanism forms no part of the present invention per se, it need not be considered in detail herein.

The pitch of the blades 10 of the rear rotor is controllable by means of arms 42 projecting from the individual blades and connected by means of ball jointed links 43 with arms 44 projecting from a rotatable swash ring 45. Ring 45 is in turn carried by a nonrotatable part which is pivoted on a horizontal axis on a sleeve 46 so as to provide for tilting movement of the swash ring 45. Sleeve 46 is adapted to move vertically on the rotor supporting and driving shaft 47.

For the purpose of moving the sleeve 46 vertically and thus effecting concurrent increase or decrease of all blades 10 of the rear rotor a lever 48 is pivoted to the sleeve and also to a push-pull rod 49, the lever 48 being fulcrummed at the upper end of a pivoted link 50. Rod 49 is actuated by a bellcrank 51 one arm of which is connected with the closed circuit cable system 52 which is extended forwardly for attachment to the lower end of the control stick 34 in a manner providing for actuation thereof as a result of fore and aft movement of the control stick. This hook-up is arranged to provide for decrease of the mean pitch of the rear rotor upon rearward movement of the control stick and for increase of mean pitch of the rear rotor upon forward movement of the control stick. This system thus serves to control the longitudinal attitude of the aircraft, the control being coupled so as to provide for "instinctive" control response.

Directional control is secured by cyclically varying the pitch of the rear rotor blades. This is accomplished by tilting the swash ring 45, for which purpose an arm 53 is rigidly connected with the nonrotative swash part. The lower or free end of arm 53 is coupled by means of a link 54 with an arm 55 of an inverted T-shaped bellcrank which is pivotally carried on a fixed part at 56. This bellcrank may be actuated by a link 57 connected with one side arm thereof and also with another bellcrank 58, which latter is associated with a closed circuit cable system 59 extended forwardly for connection with a bar 60 pivoted at 61 in the manner of a rudder bar.

The hook-up of the directional control is such that forward movement of the bar 60 at its right hand side results in cyclic pitch variation of the blades of the rear rotor in a sense providing for lateral tilt of the lift line of the rear rotor toward the left, thereby introducing a thrust component toward the left. Since the rear rotor is located well to the rear of the center of gravity of the machine as a whole, this tends to turn the aircraft toward the right. Forward movement of the bar 60 at its left hand side brings about an opposite cyclic pitch variation causing the machine to turn to the left. Thus the "rudder bar" is hooked up in a manner to provide for control in the instinctive aircraft sense.

It may be mentioned in connection with the directional control described just above that since the blades of the rear rotor are mounted with freedom for flapping movement, lateral tilt of the lift line of the rear rotor is effected by cyclic pitch variation according to which the points of maximum pitch increase and maximum pitch decrease occur when the blades pass the fore and aft positions in their circle of rotation. The reasons for this sense of control response in a rotor having flappingly pivoted blades are now well known and need not be considered in detail herein.

In addition to the controls described above for the rear rotor, the rear rotor further includes automatic mechanism for effecting a pitch correction when the lift line is laterally tilted. For this purpose the link 50 which provides a fulcrum support for lever 48 is connected with a vertically movable collar 62. Collar 62 may be moved vertically by a bellcrank one arm 63 of which is pivoted thereto, the other arm 64 being connected by a link 65 with a side arm of the T-shaped bellcrank 55 above described which is incorporated in the cyclic pitch control system. Because of this interconnection between the cyclic and mean pitch control mechanisms of the rear rotor, whenever the cyclic pitch control is actuated so as to laterally tilt the lift line of the rear rotor in either direction from a substantially vertical position, the link 50 is raised, thereby causing upward movement of the supporting sleeve 46 and the swash member 45. Such upward movement of the swash member results in increase of pitch of all blades of the rear rotor.

The mechanism described just above thus automatically compensates for the decrease of sustension derivable from the rear rotor when its lift line is tilted in either direction from the substantially vertical position. It will be observed that the linkage providing for mean pitch compensation when the lift line of the rear rotor is tilted is such that greater mean pitch increases takes place for a given angular tilt of the lift line in a range angularly offset from the vertical than in a range close to the vertical. This is of importance and automatically provides the proper extent of mean pitch compensation, since a given angular tilt of the lift line in the range close to the vertical position results in only minor loss of lift, whereas the same degree of inclination in a range somewhat removed from the vertical results in a greater loss of lift.

Referring again to Figure 2, it is noted that when employing driven rotors as herein contemplated, the rotation of the blades 8 and 9 of the two main rotors in opposite directions neutralizes the counter-torque effect of the two main rotors. Drive of the rear rotor, however, will set up a torque effect tending to rotate the machine about a vertical axis, but since the rear rotor is relatively small and carries only a minor portion of the total sustension of the aircraft, the tendency for the aircraft to rotate will be rather slight. However, any such tendency which may remain may readily be compensated for by displacement of the directional control or "rudder" bar 60, which will cause the rear rotor to set up a lateral thrust component in a sense compensating for the tendency of the torque effect to rotate the aircraft about a vertical axis.

According to the foregoing, a control system is provided for a multiple rotor aircraft, particularly an aircraft incorporating three rotors in the arrangement fully described, the control system providing for control of vertical flight, control about the rolling axis, and control about the pitching axis, all by means of mechanisms operating to regulate the mean rotor blade pitch angle of the several rotors, cyclic pitch control mechanism being utilized only in the small diameter rear rotor and only in one plane, for the purpose of securing directional control. In this way, appreciable simplification of blade mountings, hub arrangements and control parts is brought about.

The mechanism shown in Figure 3 (including especially the interconnected levers 21 and 29) constitutes a highly effective and simple system for combining control motions originating at two different sources but both adapted to regulate a given pitch control function.

As the rear rotor may be controlled to carry a varying amount of lift load, proper flight balance may be obtained for an unusually large variation in center of gravity position longitudinally of the aircraft. Adjustment for change in longitudinal C. G. location is accomplished merely by changing the neutral position of the longitudinal control stick.

I claim:

1. In an aircraft having a variable pitch sustaining rotor, a pitch control member movable in each of two opposite directions for effecting a given pitch control function, first and second controllable means each adapted to operate upon said member to effect the said pitch control function, and mechanism connecting the first and second controllable means with said movable pitch control member and including interconnected levers for combining the motions of the first and second controllable means in additive or subtractive senses.

2. A construction in accordance with claim 1 in which one of the combining levers is pivoted to said pitch control member and another of said levers is pivoted to a fixed part.

3. In an aircraft having a variable pitch sustaining rotor, a pitch control member movable in each of two opposite directions for effecting a given pitch control function, first and second controllable means each adapted to operate upon said member to effect the said pitch control function, and mechanism connecting the first and second controllable means with said movable pitch control member and including a lever pivoted to the pitch control member and connected with the first controllable means and having a fulcrum carried by a part movable by the second controllable means, whereby to combine the motions of said first and second controllable means in additive or subtractive senses.

4. In an aircraft having a variable pitch sustaining rotor, a pitch control member mounted in association with the rotor and movable substantially axially of the rotor for effecting a given pitch control function, first and second controllable means each adapted to operate upon said member to effect the said pitch control function, and mechanism connecting the first and second controllable means with said movable pitch control member including a lever pivoted to the pitch control member and connected with the first controllable means, a second lever arranged generally parallel to the first, the second lever being fulcrummed on a fixed part and being connected with the second controllable means, and linkage interconnecting said levers.

5. A construction in accordance with claim 1 in which said pitch control member effects change in mean rotor blade pitch and further including tilt control means providing for tilt of the lift line of said rotor in each of two opposite directions from a substantially upright position, one of said controllable means being automatically operated by actuation of said tilt control means to increase the mean rotor blade pitch when the tilt control means is actuated to effect tilting of the lift line in either direction from said substantially upright position.

References Cited in the file of this patent

UNITED STATES PATENTS

| | | |
|---|---|---|
| 2,380,582 | Cierva | July 31, 1945 |
| 2,417,003 | MacAlpin | Mar. 4, 1947 |
| 2,432,677 | Platt | Dec. 16, 1947 |
| 2,439,089 | Hodson | Apr. 6, 1948 |
| 2,464,991 | Roby | Mar. 22, 1949 |
| 2,496,624 | Heintze | Feb. 7, 1950 |
| 2,604,949 | McDonald | July 29, 1952 |

Disclaimer 2,877,856.—*Harris S. Campbell*, Bryn Athyn, Pa. AIRCRAFT ROTOR BLADE CONTROL MECHANISM. Patent dated Mar. 17, 1959. Disclaimer filed June 25, 1964, by the assignee, *Autogiro Company of America*.

Hereby enters this disclaimer to claims 1, 2 and 3 of said patent.
   [*Official Gazette September 15, 1964*]